United States Patent [19]

Takeda et al.

[11] Patent Number: 5,258,975
[45] Date of Patent: Nov. 2, 1993

[54] OPTICAL RECORDING MEDIUM

[75] Inventors: Hideki Takeda, Kawasaki; Fumiko Osawa, Toyama, both of Japan

[73] Assignee: Yoshida Kogyo K.K., Tokyo, Japan

[21] Appl. No.: 875,739

[22] Filed: Apr. 29, 1992

[30] Foreign Application Priority Data

May 10, 1991 [JP] Japan .................................. 3-133326

[51] Int. Cl.$^5$ .............................................. G11B 3/70
[52] U.S. Cl. ...................... 369/288; 430/495; 430/945; 428/694 LE; 369/100; 420/416; 148/301
[58] Field of Search ........................ 420/416; 148/301; 428/694, 458; 365/122; 369/13, 288

[56] References Cited

U.S. PATENT DOCUMENTS 4,202,022  5/1980  Imamura et al. ..................... 420/416
5,074,935  12/1991  Masumoto et al. .................. 420/416

FOREIGN PATENT DOCUMENTS 3-36243  2/1991  Japan .

OTHER PUBLICATIONS

Hackh's Chemical Dictionary, 1969, p. 432.
A Dictionary of Metallurgy, A. D. Merrriman, 1958, p. 190.
The Condensed Chemical Dictionary, 1971, p. 589.

*Primary Examiner*—John P. Sheehan
*Attorney, Agent, or Firm*—Flynn, Thiel, Boutell & Tanis

[57] ABSTRACT

This invention relates to a recording medium having a sufficient difference between the crystallization temperature and the melting point as well as excellent characteristics in writing and erasing. The optical recording medium comprises a recording layer consisting of a recording material capable of recording and erasing through transition between an amorphous phase and a crystalline phase by laser beam heating, the recording material having a composition represented by the general formula:

$$Ln_a X_b Al_{(100-(a+b))}$$

wherein Ln is either at least one metallic element selected from the group consisting of Y, La, Ce, Nd, Sm and Gd, or Mm (misch metal); X is at least one metallic element selected from the group consisting of Fe, Co, Ni and Cu; and a and b are, in atomic percentage, $40 \leq a \leq 80$ and $5 \leq b \leq 40$.

4 Claims, No Drawings

OPTICAL RECORDING MEDIUM

BACKGROUND OF THE INVENTION

1. Field of the Invention

The present invention relates to an optical information recording medium capable of recording, reproducing and erasing.

2. Description of the Prior Art

There have heretofore been used as the optical information medium, a read-only type one which can only read out recorded information, a direct-read-after-write type one which forms bits on a recording film by laser beam radiation to permanently record information, and an erasable type one which can arbitrarily record, reproduce and erase information, each exhibiting the characteristics of its own, respectively.

As the erasable type medium, there have been known a photomagnetic type which takes advantage of photomagnetic effect and a phase transition type which performs recording and erasing by taking advantage of the transition between a crystalline phase and an amorphous phase.

Various materials have been proposed as the recording material of the phase transition type but none of them has fully fulfilled the requisitions for this type of recording material.

For example, Te and Te-based material suffer from the defects that they are low-melting point materials, have a low crystallization temperature, a small difference between the crystallization temperature and the melting point and a poor resistance to even slight moisture causing deterioration of the surface thereof. On the other hand, Au-Si-based, and $AuAl_2$-based materials are hard to transfer into the amorphous phase, and Pd-Si-based material have a relatively high melting point and involves a fear of increasing damage to the substrate. In addition, the above-mentioned compounds suffer the drawback of being expensive in practical application since Te, Au and Pd are all rare metals.

Moreover, Te and Te-based material are defective in that they are apt to spatter the material in the step of writing information owing to the higher vapor pressure, thus making themselves nonendurable to repeated use.

SUMMARY OF THE INVENTION

An object of the present invention is to solve the above problems of the prior art and at the same time provide an optical recording medium which has a sufficient difference between the crystallization temperature and the melting point and excellent characteristics in writing and erasing.

As a result of intensive research and investigation made by the present inventors, it has been found that a specified alloy comprising Al is useful as an optical recording material of the phase transition type. The present invention has been accomplished on the basis of this finding.

Specifically, the present invention relates to an optical recording medium which comprises a recording layer consisting of a recording material capable of recording and erasing through transition between an amorphous phase and a crystalline phase by laser beam heating, the recording material having a composition represented by the general formula:

$$Ln_aX_bAl_{(100-(a+b))}$$

wherein Ln is either at least one metallic element selected from the group consisting of Y, La, Ce, Nd, Sm and Gd or Mm (misch metal) X is at least one metallic element selected from the group consisting of Fe, Co, Ni and Cu; and a and b are, in atomic percentage,

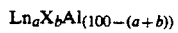

$40 \leq a \leq 80$ and $5 \leq b \leq 40$.

DETAILED DESCRIPTION OF THE PREFERRED EMBODIMENTS

As disclosed in Japanese Patent Laid-Open No. 36243/1991, the Ln-X-Al alloy has an extremely high capability to form an amorphous phase and a crystallization temperature of at least 523K that is much higher than room temperature, and, therefore, has a very high stability of the amorphous phase at around room temperature. In addition, different from Te-based compounds, the Ln-X-Al alloy has no possibility at all of spattering the material because of low vapor pressure at around the melting point, which is 1000K or lower, and minimizes the possibility that heating in the step of writing might affect a substrate. Each of the elements constituting the foregoing alloy has a Clarke number much higher than those of Pd, Au and Te, thus making itself practical to a great extent. As described hereinbefore, the optical disk according to the present invention is capable of writing and erasing with ease and stability and enables the supply of itself at a low cost.

The reason for limiting the composition to $40 \leq a \leq 80$ atomic % and $5 \leq b \leq 40$ atomic % in the general formula $Ln_aX_bAl_{(100-(a+b))}$ is that a composition outside the above range makes the amorphization difficult and extremely elevates the melting point. The compositional range of a is preferably $50 \leq a \leq 80$ atomic %. In the case of Mm being used as the Ln element, more inexpensiveness can be achieved than the case where another Ln element is used.

Examples of particularly desirable alloys as the recording material include $La_{55}Ni_{25}Al_{20}$, $Sm_{60}Co_{25}Al15$, $Gd_{50}Fe_{10}Al_{40}$ and $Mm_{55}Cu_{10}Al_{35}$.

In the optical recording medium according to the present invention, importance is attached to the use of the aforestated specified alloy material as the material constituting the recording layer, and there is no limitation to the other parts of the optical recording medium such as substrate and protective layer, thereby making any type thereof usable.

Now, the present invention will be described with reference to the examples, which however exemplify the specific embodiments of the present invention and by no means limit the present invention thereto.

EXAMPLE 1

A film of about 100 nm thickness was formed by the sputtering method using $La_{55}Ni_{25}Al_{20}$ as the target. It was confirmed with a transmission electron microscope that the above alloy was amorphous and had a crystallization temperature of 542K. The film was irradiated with laser beams having a power density of 5 mW/$\mu$m$^2$ for 1 $\mu$ sec. As a result, the amorphous phase changed to a crystalline phase causing a decrease in the reflectivity by about 13%. Then, the film was irradiated in the same region as above with laser beams having a power density of 10 mW/$\mu$m$^2$ for 50 nsec and cooled. As a result, the phase changed to amorphous phase and the reflectivity returned to the original value. The aforesaid phenomena can be caused repeatedly. An optical disk comprising $La_{55}Ni_{25}Al_{20}$ alloy with a melting point of 850K which was formed by its use on a PMMA (polymethyl methacrylate) substrate was capable of recording and erasing.

EXAMPLE 2

The same result as in the Example 1 was obtained with the optical disk comprising $Sm_{60}Co_{25}Al_{15}$ alloy having a crystallization temperature of 560K and a melting point of 870K which was prepared by the sputtering method using the same alloy as the target and a PMMA substrate.

EXAMPLE 3

The same result as in the Example 1 was obtained with the optical disk comprising $Gd_{50}Fe_{10}Al_{40}$ alloy having a crystallization temperature of 610K and a melting point of 940K which was prepared by the sputtering method using the same alloy as the target and a PMMA substrate.

The above-mentioned alloys described in the case of being applied to the optical disks in the present invention are applicable to any of the recording media which perform recording and erasing taking advantage of the phase transition between an amorphous phase and a crystalline phase by laser beam heating and are not necessarily restricted to the medium in the form of disk as a whole.

As described hereinbefore, the recording material to be used in the present invention does not damage the substrate because of a melting point not higher than 1000K, is thermally stable by virtue of a high crystallization temperature of 500K or above and is capable of writing and erasing information with ease and stability owing to the sufficient difference between the crystallization temperature of about 500K or higher and the melting point of about 800K or higher.

What is claimed:

1. An optical recording medium comprising a substrate and a recording layer provided thereon, said recording layer consisting of a recording material capable of recording and erasing through transition between an amorphous phase and a crystalline phase by laser beam heating, said recording material having a composition represented by the general formula:

$$Ln_a X_b Al_{(100-(a+b))}$$

wherein Ln is either at least one metallic element selected from the group consisting of Y, La, Ce, Nd, Sm and Gd; X is at least one metallic element selected from the group consisting of Fe, Co, Ni and Cu; and a and b are, in atomic percentage, $40 \leq a \leq 80$ and $5 \leq b \leq 40$, with the proviso that $a+b < 100$.

2. The optical recording medium of claim 1, wherein said recording material is selected from the group consisting of $La_{55}Ni_{25}Al_{20}$, $Sm_{60}Co_{25}Al_{15}$, and $Gd_{50}Fe_{50}Al_{40}$.

3. The optical recording medium of claim 1, wherein said substrate is made of polymethyl methacrylate.

4. A method of recording information on an optical recording medium comprising the steps of:

providing an optical recording medium, said optical recording medium comprising a substrate and a recording layer provided thereon, said recording layer consisting of a recording material capable of recording and erasing through transition between an amorphous phase and a crystalline phase by laser beam heating said recording material having a composition represented by the general formula:

$$Ln_a X_b Al_{(100-(a+b))}$$

wherein Ln is either at least one metallic element selected from the group consisting of Y, La, Ce, Nd, Sm and Gd; X is at least one metallic element selected from the group consisting of Fe, Co, Ni and Cu; and a and b are, in atomic percentage, $40 \leq a \leq 80$ and $5 \leq b \leq 40$, with the proviso that $a+b < 100$; and irradiating said optical recording medium with a laser beam.

* * * * *

UNITED STATES PATENT AND TRADEMARK OFFICE
CERTIFICATE OF CORRECTION

PATENT NO. : 5 258 975

DATED : November 2, 1993

INVENTOR(S) : Hideki TAKEDA et al

It is certified that error appears in the above-identified patent and that said Letters Patent is hereby corrected as shown below:

Column 4, line 7; change "(100-(a+b)" to
---(100-(a+b))---.

line 32; change "(100-(a+b)" to
---100-(a+b))---.

Signed and Sealed this

Seventeenth Day of May, 1994

Attest:

BRUCE LEHMAN

Attesting Officer    Commissioner of Patents and Trademarks